US011881100B2

United States Patent

(12) United States Patent
Max et al.

(10) Patent No.: US 11,881,100 B2
(45) Date of Patent: Jan. 23, 2024

(54) DETERMINATION AND USE OF CLUSTER-BASED STOPPING POINTS FOR MOTOR VEHICLES

(71) Applicant: Volkswagen Aktiengesellschaft, Wolfsburg (DE)

(72) Inventors: Stephan Max, Gifhorn (DE); Thomas Günterberg, Wolfsburg (DE); Timur Aminev, Braunschweig (DE); Peter Baumann, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 205 days.

(21) Appl. No.: 17/045,726

(22) PCT Filed: Mar. 27, 2019

(86) PCT No.: PCT/EP2019/057698

§ 371 (c)(1),
(2) Date: Oct. 6, 2020

(87) PCT Pub. No.: WO2019/192904

PCT Pub. Date: Oct. 10, 2019

(65) Prior Publication Data

US 2021/0150889 A1 May 20, 2021

(30) Foreign Application Priority Data

Apr. 6, 2018 (DE) ........................ 102018205199.2

(51) Int. Cl.
*G08G 1/01* (2006.01)

(52) U.S. Cl.
CPC ......... *G08G 1/0112* (2013.01); *G08G 1/0129* (2013.01)

(58) Field of Classification Search
CPC ........................... G08G 1/0112; G08G 1/0129
(Continued)

(56) References Cited

U.S. PATENT DOCUMENTS

| | | | | |
|---|---|---|---|---|
| 8,527,199 B1 * | 9/2013 | Burnette | ................ | G01C 21/32<br>701/425 |
| 9,176,500 B1 * | 11/2015 | Teller | .................... | B60W 30/08 |

(Continued)

FOREIGN PATENT DOCUMENTS

| | | |
|---|---|---|
| DE | 102012003632 A1 | 10/2012 |
| DE | 102012219850 A1 | 4/2014 |

(Continued)

OTHER PUBLICATIONS

PCT/EP2019/057698. Int'l Search Report (dated Jul. 12, 2019).
DE102018205199.2. Office Action (dated Apr. 16, 2019).

*Primary Examiner* — Kerri L McNally
*Assistant Examiner* — Thang D Tran
(74) *Attorney, Agent, or Firm* — Peter Zura; LOZA & LOZA, LLP

(57) ABSTRACT

Technologies and techniques for determining a cluster-based stopping point for a motor vehicle for a predefined reason for stopping in a lane of a road. The individual stopping points of a plurality of vehicles may be determined for the reason for stopping in the lane, wherein the vehicles are controlled by individual drivers. A distribution of the individual stopping points in the lane at least in the direction of travel of the vehicles may be determined. The maximum of the distribution may be determined and stored as a cluster-based stopping point. The cluster-based stopping point determined in this way may be applied to autonomous driving technologies.

21 Claims, 3 Drawing Sheets

(58) Field of Classification Search
USPC .......................................................... 340/933
See application file for complete search history.

(56) References Cited

U.S. PATENT DOCUMENTS

| | | | | |
|---|---|---|---|---|
| 9,436,180 | B1 * | 9/2016 | Fredinburg | G06F 21/6254 |
| 9,983,013 | B1 * | 5/2018 | Krunic | G01C 21/3644 |
| 9,995,584 | B1 * | 6/2018 | Kanevsky | G07C 5/008 |
| 2005/0259033 | A1 * | 11/2005 | Levine | G08G 1/165 345/7 |
| 2007/0096943 | A1 * | 5/2007 | Arnold | G01S 13/66 340/925 |
| 2007/0222639 | A1 * | 9/2007 | Giles | G08G 1/07 701/119 |
| 2008/0238721 | A1 * | 10/2008 | Roberts | G08G 1/0104 340/932 |
| 2009/0005984 | A1 * | 1/2009 | Bradley | G01C 21/20 701/469 |
| 2009/0140887 | A1 * | 6/2009 | Breed | G01S 13/865 701/116 |
| 2012/0185113 | A1 * | 7/2012 | Pampus | B60W 30/06 701/1 |
| 2013/0076538 | A1 * | 3/2013 | Uno | G08G 1/096783 340/905 |
| 2013/0129150 | A1 * | 5/2013 | Saito | G06V 20/58 382/104 |
| 2013/0138276 | A1 * | 5/2013 | Soderi | B61L 3/008 701/19 |
| 2013/0201051 | A1 * | 8/2013 | Kreter | G01S 13/91 342/52 |
| 2013/0342368 | A1 * | 12/2013 | Nathanson | H04L 69/22 340/903 |
| 2015/0211868 | A1 * | 7/2015 | Matsushita | G01C 21/3638 701/457 |
| 2015/0254986 | A1 * | 9/2015 | Fairfield | G08G 1/161 707/687 |
| 2015/0294233 | A1 * | 10/2015 | Aultman | G06N 20/00 706/12 |
| 2016/0104377 | A1 * | 4/2016 | French | G08G 1/091 701/117 |
| 2016/0257309 | A1 * | 9/2016 | Kumar | B60W 50/0097 |
| 2016/0258764 | A1 * | 9/2016 | Phuyal | G01C 21/32 |
| 2016/0265930 | A1 * | 9/2016 | Thakur | G05D 1/0088 |
| 2016/0295624 | A1 * | 10/2016 | Novlan | H04L 67/12 |
| 2017/0011627 | A1 * | 1/2017 | Murai | G08G 1/097 |
| 2017/0144658 | A1 * | 5/2017 | Viehmann | B60W 30/02 |
| 2018/0045832 | A1 * | 2/2018 | Ibrahim | G08G 1/08 |
| 2018/0052458 | A1 * | 2/2018 | Tsuji | B60W 30/143 |
| 2018/0139431 | A1 * | 5/2018 | Simek | H04N 13/271 |
| 2018/0143023 | A1 * | 5/2018 | Bjorke | G06T 19/003 |
| 2018/0144631 | A1 * | 5/2018 | Neumann | G01S 19/42 |
| 2018/0284771 | A1 * | 10/2018 | Ravichandran | B60W 30/181 |
| 2018/0374345 | A1 * | 12/2018 | Suzuki | G08G 1/04 |
| 2019/0100134 | A1 * | 4/2019 | Eiden | B60Q 1/44 |
| 2019/0152490 | A1 * | 5/2019 | Lan | G05D 1/0088 |
| 2019/0210604 | A1 * | 7/2019 | Limbacher | B60W 30/143 |
| 2019/0235521 | A1 * | 8/2019 | Mudalige | G05D 1/0248 |
| 2019/0279508 | A1 * | 9/2019 | Wang | H04W 4/46 |
| 2020/0156641 | A1 * | 5/2020 | Kretschmann | B60W 30/00 |
| 2020/0298877 | A1 * | 9/2020 | Takamatsu | G01S 13/931 |

FOREIGN PATENT DOCUMENTS

| | | | |
|---|---|---|---|
| DE | 102013016488 | A1 | 4/2015 |
| DE | 102015212027 | A1 | 12/2016 |
| DE | 102015222033 | A1 | 5/2017 |

* cited by examiner

DETERMINATION AND USE OF CLUSTER-BASED STOPPING POINTS FOR MOTOR VEHICLES

RELATED APPLICATIONS

The present application claims priority to International Patent App. No. PCT/EP2019/057698 to Stephan Max et al., filed Mar. 27, 2019, which further claims priority to German Pat. App. No. 102018205199.2 filed Jun. 4, 2018, each the contents being incorporated by reference in their entirety herein.

BACKGROUND

The present disclosure relates to a method for determining swarm-based stopping points for a motor vehicle, and a method for the use of such swarm-based stopping points in a motor vehicle.

Regarding road traffic as a swarm of motor vehicles has become a widespread practice in traffic studies. By way of example, a swarm-based simulation of road traffic can be used to optimize traffic light phases at heavily frequented intersections.

If, for example, the trajectories of numerous vehicles, such as a vehicle swarm, are observed on a section of a road, it becomes clear that the trajectories of the individual vehicles on the section of the road normally differ. It is therefore possible to define an average pathway for the vehicle swarm being observed, which is then referred to as the swarm trajectory on this section of the road.

Currently, stopping points for motor vehicles that are used for autonomous driving are determined from the position of the detected reason for stopping. More specifically, a camera in a motor vehicle detects a stopping line on the road or in the driving lane, for example the stopping line associated with a stop sign, and calculates a stopping point in the lane before reaching the line. The vehicle is stopped at this stopping point within a predefined tolerance via a corresponding control in an autonomous mode. A predefined tolerance in this case means that front end of the vehicle comes to a stop above the determined stopping point within a predetermined tolerance.

The disadvantage, however, is that this stopping point is actually very dependent on the environment of the reason for stopping. In other words, when the vehicle automatically stops correctly, it may be the case that the driver has instinctively moved this stopping point in response to the environment. By way of example, a control in the vehicle would correctly stop the vehicle one meter in front of the stop sign, but a human driver would stop directly on the stopping line, for example, or may even have to drive over this line in order to obtain a good view of the intersection, such that the "correct" stopping point for the driver "feels" wrong, and is actually impractical.

DE 10 2012 003 632 A1 describes a method for providing information relating to construction sites to vehicles, comprising the following steps:

- collecting information relating to construction sites on at least one server that is accessible online;
- evaluating and/or processing the information by the at least one server;
- providing the evaluated and/or processed information by the at least one server;
- transmitting the evaluated and/or processed information to a vehicle.

In particular, traffic signs, construction site signs, guardrails, or similar visual features of a construction site are recorded, interpreted and identified using a camera integrated in the vehicle.

DE 10 20143 016 488 A1 relates to a motor vehicle comprising at least one driver assistance system for precalculation of forecast data regarding at least one future driving situation for the motor vehicle by evaluating ego data relating to the motor vehicle, and environmental data relating to the motor vehicle environment, wherein the motor vehicle can be controlled by a driver when the driver assistance system is in a first operating mode. The driver assistance system is also configured to switch temporarily to a second operating mode when a triggering condition, or at least one triggering condition of numerous triggering conditions, has been satisfied, in which the motor vehicle is controlled autonomously by the driver assistance system, without intervention on the part of driver, wherein the triggering condition is configured to evaluate at least the forecast data and at least one driver characteristic datum that describes a characteristic of the driver.

An aspect of the present disclosure is therefore to improve the determination of stopping points on a motor vehicle roadway, and the use thereof in a motor vehicle, and to adapt to the current environment.

BRIEF SUMMARY

In some examples, systems and methods are disclosed for determining a swarm-based stopping point for a motor vehicle for a predefined reason for stopping in a driving lane on a roadway. The system and associated method may include determining the individual stopping points of numerous vehicles for the reason for stopping in the lane, wherein the vehicles are being driven by individual drivers; determining a distribution of the individual stopping points in the lane, at least in the direction of travel for the vehicles; and determining the maximum distribution and storing this maximum as a swarm-based stopping point.

Stopping points may be determined in relation to a reason for stopping on a predefined roadway through a predetermined number of test drives by numerous test vehicles controlled individually by drivers, i.e. not driven autonomously or partially autonomously, and compiled in a distribution. A swarm-based stopping point for this reason for stopping on the predefined roadway can then be derived from the distribution of the determined stopping points.

The distribution of individual stopping points may be configured as a function of the direction of travel. In other words, a one-dimensional distribution of the individual stopping points is determined in the direction of travel, normally along the x-axis, and used for determining the swarm-based stopping points for the reason for stopping. It may not be necessary to take into account the distribution in the direction perpendicular thereto, such that the swarm-based stopping point for the reason for stopping may be in the middle of the roadway under consideration.

The distribution of the individual stopping points may be configured as a function of the direction of travel and the direction perpendicular to the direction of travel. In this case, the distribution is determined along both the x-axis, for example the direction of travel, and along the y-axis, for example the direction perpendicular thereto. A maximum of the distribution then indicates the position of the swarm-based stopping point along both the x-axis and the y-axis before reaching the stopping point in the relevant driving lane.

The determination of the individual stopping points may be represented as a histogram. Of course, other methods for determining the distribution can likewise be used.

It is also preferably checked whether the swarm-based stopping point lies within a predefined, legal stopping area, wherein the determined swarm-based stopping point is discarded if the check has a negative result. If the swarm-based stopping point lies beyond a stopping line in the direction of travel for a stop sign functioning as the reason for stopping, for example, it cannot be used, because it does not satisfy the legal requirements.

In some examples, systems and related methods are disclosed for using a swarm-based stopping point in an autonomous motor vehicle, wherein the swarm-based stopping point has been determined using the method described herein. The configurations may include determining a future reason for stopping in the lane in which the vehicle is traveling by means of an environment sensor system and/or a navigation system in the motor vehicle, determining a swarm-based stopping point for the upcoming reason for stopping, and driving to the swarm-based stopping point and stopping the motor vehicle at the swarm-based stopping point.

In this manner, the autonomous vehicle behaves in a manner comparable to a vehicle driven by an individual.

The swarm-based stopping point is also preferably supplemented with an acceptable region, which extends around the swarm-based stopping point, such that the autonomously driven motor vehicle is brought to a stop within the acceptable region.

The swarm-based stopping point and, if available, the acceptable region is also preferably taken from the map information in the navigation system, or requested wirelessly from a backend computer.

The environment sensor system in the motor vehicle preferably determines an internal stopping point in relation to the detected reason for stopping, and aligns it with the swarm-based stopping point. This increases safety with autonomous driving.

BRIEF DESCRIPTION OF THE DRAWINGS

A preferred embodiment of the present disclosure shall be explained below in reference to the drawings. Therein.

DETAILED DESCRIPTION

Figure 1:
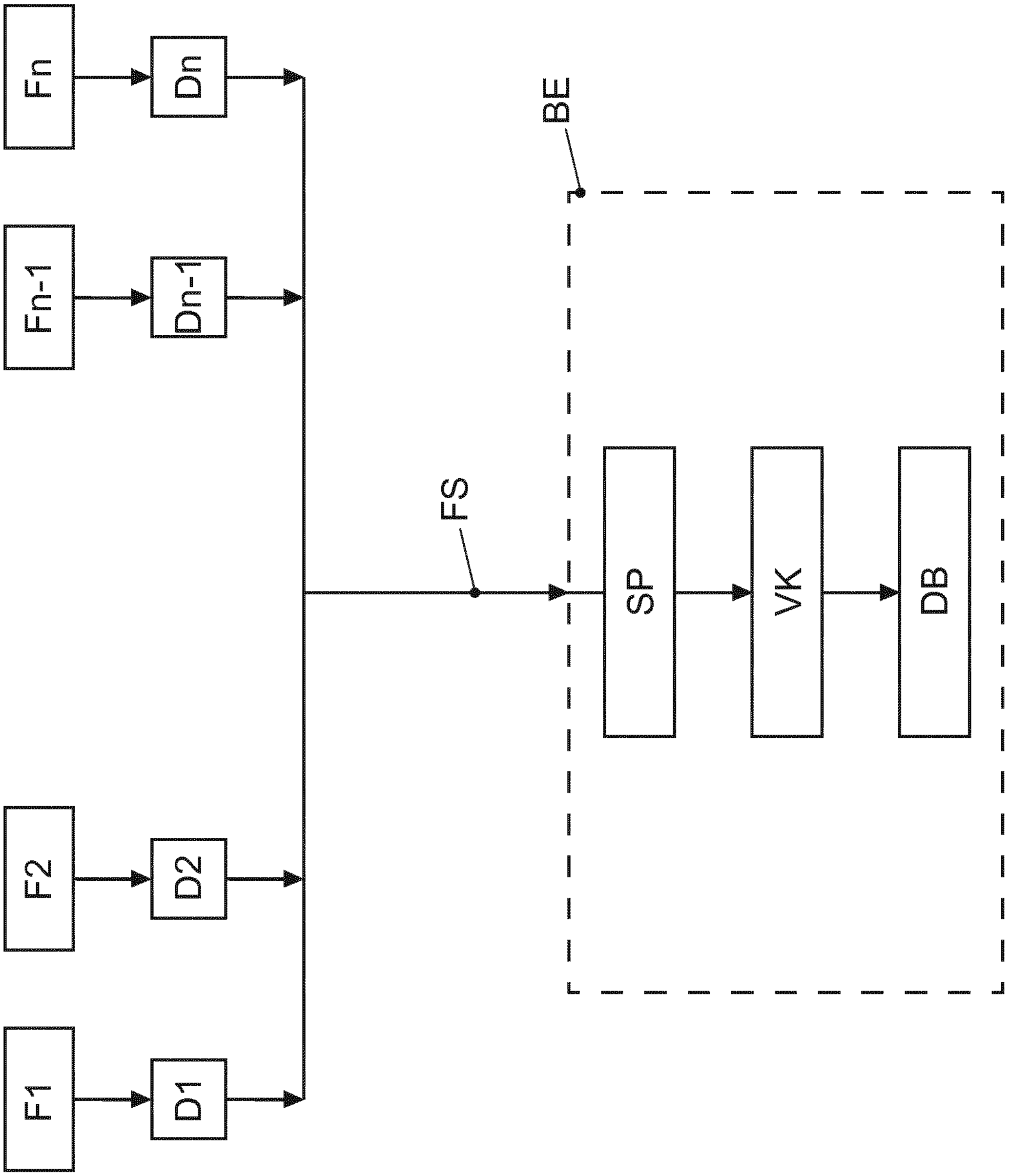
FIG. 1 shows the determining and treatment of swarm data for determining stopping points.

A schematic illustration of the determination of swarm-based stopping points for motor vehicles with regard to a reason for stopping is shown in FIG. 1. Numerous vehicles F1, F2, . . . Fn−1, Fn, n e N, are driving along a predefined section of a driving lane, wherein there is at least one reason for stopping for the motor vehicles F1 to Fn in the predefined section. A reason for stopping is understood to be a location in a driving lane at which the motor vehicle must at least temporarily stop, for example a traffic light at an intersection or junction, a cross-walk, a stop sign, or a yield sign.

The vehicles F1 to Fn are used for collecting data relating to the section that is travelled by means of an environment sensor system in the vehicle, in particular data relating to the stopping point on the section that is travelled, wherein the data collecting vehicles F1 to Fn are controlled manually by a driver. Each of the vehicles F1 to Fn transmits so-called swarm-data D1, D2, . . . , Dn−1, Dn via a transmission path, for example a radio connection or transmission path, to a backend computer BE. The transmitted swarm data D1 to Dn comprise data regarding the environment of the vehicles at the stopping points on the section that is travelled, for example camera data or environment images, as well as the behavior of the vehicle in the environment of the stopping point, for example trajectory data, as well as, potentially, vehicle-specific data, such as the time of day, or the speed and position of the respective vehicle.

The swarm data D1 to Dn may be stored in the backend computer BE in a memory SP, and appropriately sorted or pre-processed as a function of the reason for stopping. In other words, for each reason for stopping on the section that is travelled, there are corresponding swarm data.

In a downstream processing device VK, the correct and actual stopping points for the vehicle may be determined from the respective swarm data D1 to Dn for the detected reason for stopping. Accordingly, a correct stopping region may then determined from the diverse correct stopping points for the vehicles F1 to Fn for a reason for stopping. An actual stopping point distribution is also determined for the reason for stopping from the various actual stopping points for the vehicles F1 to Fn, i.e., from the swarm, which the drivers of the vehicles F1 to Fn actually drove to. The actual stopping point distribution is then overlaid on or combined with the legal stopping point for the respective reason for stopping, such that a stopping point with the greatest probability for the swarm is obtained, which may lie within the acceptable stopping region for the reason for stopping, and is then referred to as a swarm-based stopping point.

These swarm-based stopping points for the respective reasons for stopping are stored in a corresponding data base DB, such that these swarm-based stopping points can be shared via a suitable interface (not shown) with querying, automatically driven vehicles. An online interface or a card update, etc. can be used as the interface.

Generally speaking, the following may be determined:

a) A correct stopping point for a respective reason for stopping is detected from the swarm data D1 to Dn by means of the environment sensor system through the detection of a stopping line, a stop sign, etc., and/or from the trajectories of the swarm.

b) The right stopping region in accordance with the traffic laws is determined for this stopping point for the reason for stopping.

c) A stopping point distribution for the respective reason for stopping is also determined from the movement of the swarm.

d) The stopping point distribution for the swarm and the legally permissible stopping point for the respective reason for stopping are combined such that a swarm-based stopping point with the greatest probability for the swarm is obtained, which is nevertheless within the acceptable stopping region for the respective reason for stopping.

e) This swarm-based stopping point for a respective reason for stopping is sent to the vehicles via an interface (online, for a card update, etc.) such that the vehicle can drive to the respective stopping point accordingly.

f) Optionally, the acceptable region according to section d) is then reduced by a possible position tolerance. The position tolerance indicates the imprecision resulting when the vehicle attempts to come to a stop at the stopping point. For this, not only is the wear on the vehicle decisive, but also the control or actuators for the vehicle that carry out the corresponding functions.

Figure 2:
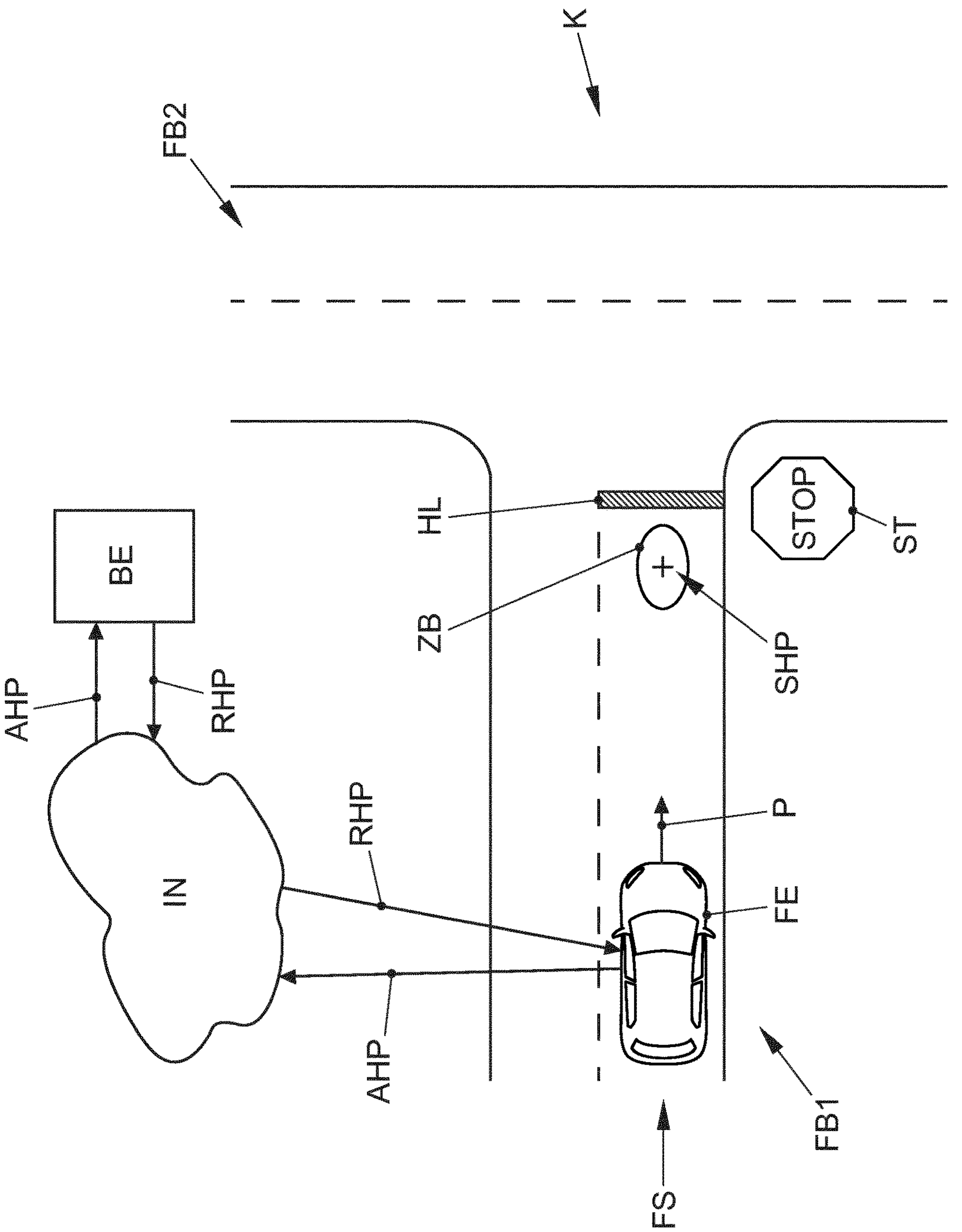
FIG. 2 shows the use of a swarm-based stopping point in a motor vehicle.

FIG. 2 illustrates an example of an autonomous ego vehicle FE, approaching an intersection K in the driving lane FS on a roadway FB1, which is in the form of a junction in the present example, wherein the direction of travel of the ego vehicle FE is indicated by the arrow P. Before the ego vehicle FE reaches the junction where the roadway FB1 intersects the second roadway FB2 that runs perpendicular thereto, there is a traffic sign in the form of a stop sign ST and a stopping line HL running across the driving lane FS. Because of the stop sign ST, the autonomous ego vehicle FE must stop at the stopping line HL. The ego vehicle FE uses an appropriate environment sensor system to determine the stopping point, which detects the stop sign ST and the stopping line HL and calculates a vehicle-based internal stopping point based on the environment detection. The ego vehicle FE also sends a radio query AHP to the backend computer BE via the Internet IN, wherein the query AHP queries a swarm-based stopping point SHP for the junction K. The position of the ego vehicle FE, the direction of travel, and any other necessary data for identifying the junction K of the two roadways FB1 and FB2 are normally sent from the ego vehicle FE. The backend computer BE sends a message RHP to the ego vehicle FE in response to the query AHP, which contains a specific swarm-based stopping point SHP for this junction K. On the basis of the internally calculated stopping point (not shown) and the swarm-based stopping point SHP, the ego vehicle FE stops at a suitable position before reaching the stopping line HL. The ego vehicle FE then normally stops at the swarm-based stopping point SHP. The actual stopping point determined from the internal stopping point and the swarm-based stopping point SHP may differ, however.

Furthermore, wireless transmission of the swarm-based stopping point to the ego vehicle is just one possibility. The swarm-based stopping points SHP can also be a component of a very precise digital map in the ego vehicle FE, such as that used for a precise position determination and navigation of an autonomously driven ego vehicle FE. Instead of a precisely defined swarm-based stopping point SHP, the swarm-based stopping point SHP can be supplemented with a position tolerance ZB, such that the swarm-based stopping point SHP is surrounded by an acceptable region ZB. The position tolerance ZB indicates the imprecision resulting when the vehicle attempts to stop at a swarm-based stopping point. Not only is the wear to the vehicle decisive here, but also the control or actuators in the vehicle that carry out the corresponding functions.

Figure 3:
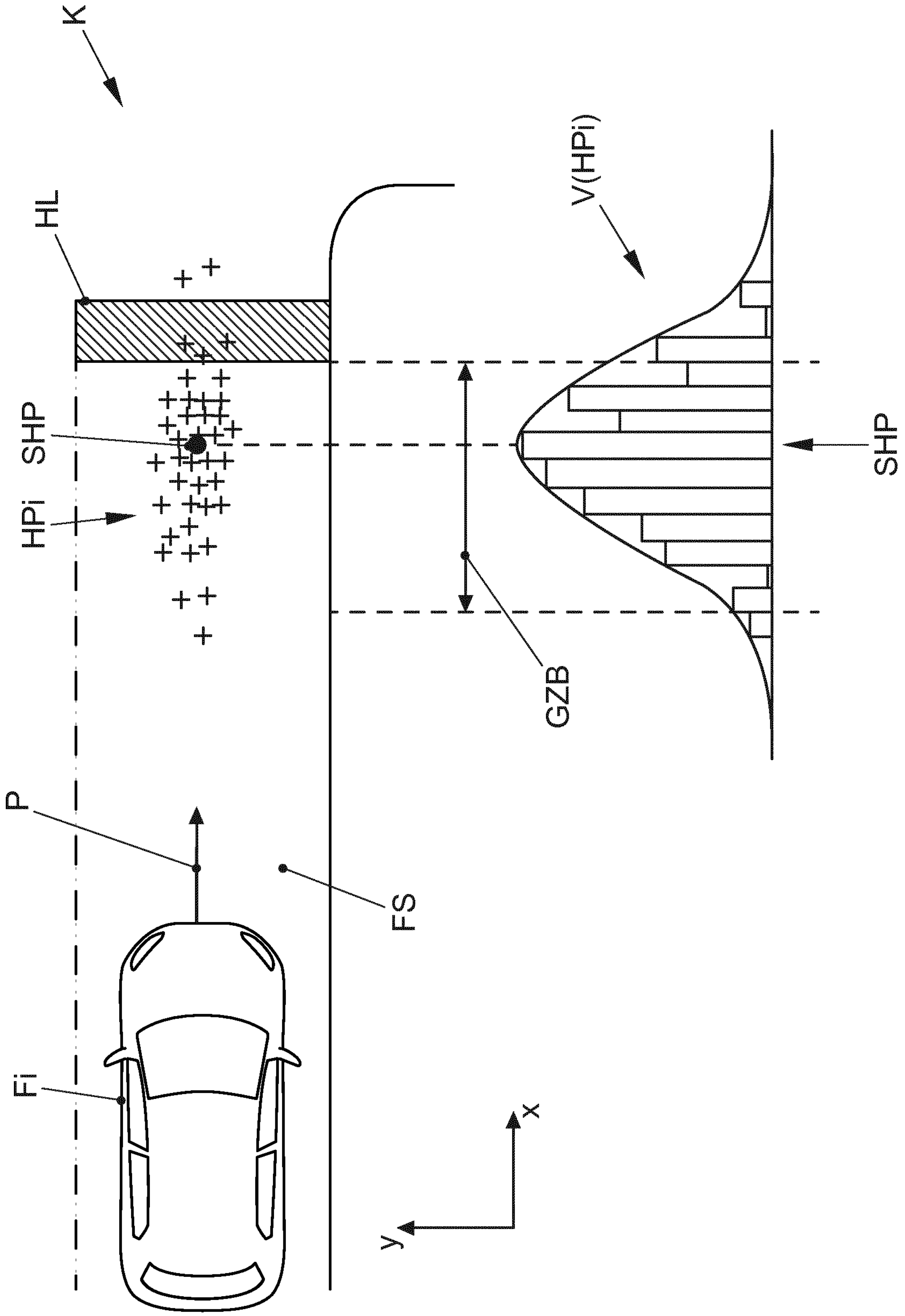
FIG. 3 shows an exemplary determination of a swarm-based stopping point.

FIG. 3 shows an example of the determination of a swarm-based stopping point SHP at a stopping line HL that is analogous to FIG. 2. Numerous vehicles Fi, where i=1, . . . , n, travel on a driving lane FS in the direction of the arrow P to a stopping line HL for a stop sign (not shown) at a junction or intersection K. The vehicles Fi, of which only one Fi is shown in FIG. 3, by way of example, stop at different points, at or even beyond the stopping line HL. These stopping points are indicated in FIG. 3 by numerous crosses HPi. One possible analysis of the distribution of the stopping points with respect to the stopping line HL for the i test vehicles Fi, where i=1, . . . , n, is indicated in FIG. 3 by considering the distribution of stopping points HPi only along the x-axis. This results in the histogram at the bottom of FIG. 3, in which the area of the driving lane FS around the stopping line HL is divided into strips of a predefined width along the x-axis, and the number of vehicles Fi that have a stopping point lying within a predetermined strip is determined. With the prerequisite that the number i of vehicles is sufficiently large, a distribution V(HPi) of the stopping points HPi is obtained by means of this histogram. The maximum for the distribution V(HPi) of the stopping points HPi along the x-axis is determined to be the swarm-based stopping point SHP. Because the determination of the swarm-based stopping points by means of a histogram is independent of the y-axis, the swarm-based stopping point SHP is located in the middle of the driving lane FS, as is the case in FIG. 3. It is also checked whether the swarm-based stopping point SHP lies within the legally acceptable stopping region GZB before reaching the stopping line. If it lies outside the acceptable region ZB, it cannot be used.

It is also possible to create a two-dimensional distribution, which determines the number of stopping points HPi as a function of both the x-axis and the y-axis, for example, by means of a two-dimensional histogram. In this manner, the position of the swarm-based stopping point can also be determined as a function of the y-axis on the driving lane.

LIST OF REFERENCE SYMBOLS

F1 vehicle 1
F2 vehicle 2
Fn−1 vehicle n−1
Fn vehicle n
D1 swarm data vehicle 1
D2 swarm data vehicle 2
Dn−1 swarm data vehicle n−1
Dn swarm data vehicle n
FS transmission path
BE backend computer
SP storing and sorting
VK processing and combination
DB data base
FB1 roadway 1
FS driving lane
FB2 roadway 2
K intersection/junction
FE ego vehicle
HL stopping line
ST stop sign
IN internet
AHP query swarm-based stopping point
RHP transmission of swarm-based stopping point
SHP swarm-based stopping point
ZB acceptable region with positive tolerance
Fi i-th vehicle
HPi stopping points of vehicles i to n
GZB legal acceptable stopping region

The invention claimed is:

1. A method for determining a swarm-based stopping point for a motor vehicle for a predefined reason for stopping in a driving lane on a roadway, comprising: determining individual stopping points along two dimensions for a plurality of vehicles, wherein the individual stopping points each comprise a position tolerance defining a stopping region for the individual stopping point; determining one of a plurality of reasons for stopping in the driving lane for each of the individual stopping points, based on image data; determining a distribution of the individual stopping points in the driving lane, at least in the direction of travel towards the determined individual stopping points for the vehicles; generating a swarm-based stopping point (i) based on a maximum of the distribution, and (ii) as a function of the determined reason for stopping; and applying the generated swarm-based stopping point for the motor vehicle.

2. The method according to claim 1, wherein the distribution of the individual stopping points comprises a function of the direction of travel.

3. The method according to claim 1, wherein the distribution of the individual stopping points is a function of the direction of travel and the direction perpendicular to the direction of travel.

4. The method according to claim 1, wherein the distribution of the individual stopping points comprises a histogram.

5. The method according to claim 1, further comprising determining whether the swarm-based stopping point lies within a predefined stopping region.

6. The method according to claim 5, wherein the determined swarm-based stopping point is discarded if the determining whether the swarm-based stopping point lies within the predefined stopping region results in a negative determination.

7. The method according to claim 5, further comprising receiving data comprising one of one of digital map information and/or swarm data, and applying the received data to generate the swarm-based stopping point.

8. The method according to claim 1, further comprising determining an internal stopping point for the detected reason for stopping for the motor vehicle via an environment sensor, and aligning the internal stopping point with the swarm-based stopping point.

9. A system for determining a swarm-based stopping point for a motor vehicle for a predefined reason for stopping in a driving lane on a roadway, comprising: communications circuitry; a storage apparatus; and a processing device, wherein the storage apparatus and processing device are configured to determine individual stopping points along two dimensions for a plurality of vehicles, wherein the individual stopping points each comprise a position tolerance defining a stopping region for the individual stopping point; determine one of a plurality of reasons for stopping in the driving lane for each of the individual stopping points, based on image data; determine a distribution of the individual stopping points in the driving lane, at least in the direction of travel towards the determined individual stopping points for the vehicles; generate a swarm-based stopping point (i) based on a maximum of the distribution, and (ii) as a function of the determined reason for stopping; and apply the generated swarm-based stopping point for the motor vehicle.

10. The system according to claim 9, wherein the distribution of the individual stopping points comprises a function of the direction of travel.

11. The system according to claim 9, wherein the distribution of the individual stopping points is a function of the direction of travel and the direction perpendicular to the direction of travel.

12. The system according to claim 9, wherein the distribution of the individual stopping points comprises a histogram.

13. The system according to claim 9, wherein the storage apparatus and processing device are configured to determine whether the swarm-based stopping point lies within a predefined stopping region.

14. The system according to claim 13, wherein the storage apparatus and processing device are configured to discard the determined swarm-based stopping point if it is determined to not be within the predefined stopping region results in a negative determination.

15. The system according to claim 13, wherein the storage apparatus and processing device are configured to receiving data via the communications circuitry, the data comprising one of one of digital map information and/or swarm data, and wherein the storage apparatus and processing device are configured to apply the received data to generate the swarm-based stopping point.

16. The system according to claim 9, wherein the storage apparatus and processing device are configured to determine an internal stopping point for the detected reason for stopping for the motor vehicle via an environment sensor, and align the internal stopping point with the swarm-based stopping point.

17. A method for determining a swarm-based stopping point for a motor vehicle for a predefined reason for stopping in a driving lane on a roadway, comprising: determining individual stopping points along two dimensions for a plurality of vehicles, wherein the individual stopping points each comprise a position tolerance defining a stopping region for the individual stopping point; determining one of a plurality of reasons for stopping in the driving lane, based on image data; determining a two-dimensional histogram distribution of the individual stopping points in the driving lane, at least in the direction of travel for the vehicles; generating a swarm-based stopping point based on (i) a maximum of the distribution, and (ii) as a function of the determined reason for stopping; and applying the generated swarm-based stopping point for the motor vehicle.

18. The method according to claim 17, wherein the distribution of the individual stopping points comprises a function of the direction of travel.

19. The method according to claim 17, wherein the distribution of the individual stopping points is a function of the direction of travel and the direction perpendicular to the direction of travel.

20. The method according to claim 19, further comprising receiving data comprising one of one of digital map information and/or swarm data, and applying the received data to generate the swarm-based stopping point.

21. The method according to claim 17, further comprising determining an internal stopping point for the detected reason for stopping for the motor vehicle via an environment sensor, and aligning the internal stopping point with the swarm-based stopping point.

* * * * *